United States Patent [19]

Dzyacky

[11] Patent Number: 5,784,538
[45] Date of Patent: Jul. 21, 1998

[54] PROCESS AND APPARATUS FOR PREDICTING AND CONTROLLING FLOOD AND CARRYOVER CONDITIONS IN A SEPARATION COLUMN

[75] Inventor: George E. Dzyacky, 9238 Olcott Ave., St. John, Ind. 46373

[73] Assignee: George E. Dzyacky, St. John, Ind.

[21] Appl. No.: 467,228

[22] Filed: Jun. 6, 1995

[51] Int. Cl.[6] .................................................. G06F 15/18
[52] U.S. Cl. .................................. 395/50; 395/10
[58] Field of Search ....................... 203/4, 26; 395/50, 395/10, 75, 62

[56] References Cited

U.S. PATENT DOCUMENTS

| | | | |
|---|---|---|---|
| 3,261,777 | 7/1966 | Iscol et al. | 208/113 |
| 3,591,783 | 7/1971 | Zumwalt | 235/151.12 |
| 3,830,698 | 8/1974 | Kleiss | 203/2 |
| 4,022,593 | 5/1977 | Lerner | 55/90 |
| 4,092,722 | 5/1978 | Hofferber | 364/500 |
| 4,283,254 | 8/1981 | Binau et al. | 203/4 |
| 4,290,110 | 9/1981 | Makovec | 364/500 |
| 4,539,076 | 9/1985 | Swain | 202/154 |
| 4,698,313 | 10/1987 | Stewart | 436/55 |
| 4,736,316 | 4/1988 | Wallman | 364/149 |
| 4,749,471 | 6/1988 | Kam et al. | 208/113 |
| 4,773,968 | 9/1988 | O'Connell et al. | 203/26 |
| 4,857,229 | 8/1989 | Najjar et al. | 252/373 |
| 5,006,992 | 4/1991 | Skeirik | 364/513 |
| 5,132,918 | 7/1992 | Funk | 364/501 |
| 5,223,152 | 6/1993 | Freymeyer et al. | 210/774 |
| 5,343,407 | 8/1994 | Beauford et al. | 364/501 |

OTHER PUBLICATIONS

L.A. Edwards, *Computerization: Problems and Solutions*, Hydrocarbon Processing, cover pg. and pp. 57–60, 62, 64, 65 (pgs. missing due to advertisements—document is complete); dated Jun. 1994.

J.P. Ignizio, *Introduction to Expert Systems—The Development and Implementation of Rule–Based Expert Systems*, McGraw–Hill, Inc., cover pgs. and pp. 20–21 and 152–153, dated 1991.

Honeywell document, *Basic System TDC 3000*, pp. 1–5 & 14–17, dated 1983.

*Hydrocarbon Processing, Advanced Process Control Strategies '93*, 12 pgs., dated Sep. 1993.

R.O. Pelham, *Process Optimization in the HIP*, Hydrocarbon Processing, cover pg. and pp. 69–73, dated Jul. 1993.

R.E. Treybal, *Tray Towers*, McGraw–Hill, 3, pp. 158–163.

Coelho et al. "Multi–Loop Adaptive Controllers in Nonlinear Process Control," Decision and Control, 1991 30th Annual Conf., pp. 2909–2914, Dec. 31, 1991.

Cram et al. "Expert System Monitoring and Control of a Polymer Plant," IEE Colloq. (Dec. 31, 1988) No. 048: Expert Systems in Process Control, pp. 6/1–6/6.

(List continued on next page.)

*Primary Examiner*—Tariq R. Hafiz
*Attorney, Agent, or Firm*—Schwegman, Lundberg, Woessner & Kluth, P.A.

[57] ABSTRACT

This invention comprises a process and apparatus for identifying pre-flood and pre-carryover conditions in a separation column operation. The process preferably includes monitoring at least two measurable process variables, calculating a rate of change for each variable, assigning a rate of change alarm to each variable, and identifying a synchronous rate of change in at least two of the variables. The process further includes avoiding a flood or carryover condition by reducing a reboiler temperature in a reboiler connected to the separation column when the alarm activates simultaneously for at least two of the measurable process variables, and then incrementally raising the reboiler temperature during a period of time. The process further includes a system whereby the capacity in a separation column is optimized, and wherein separation is improved even when the separation column is operated at least than capacity.

30 Claims, 5 Drawing Sheets

Nakayama et al. "Model–based Automatic Programming for Plant Control," Artificial Intelligence Applications, 1990 Conf., pp. 281–287, Dec. 31, 1990.

Nataraj "Robust Multivariable Feedback Design for an Extractive Distillation Column," Control 94 (IEE Conf. Pub 389) Part II, pp. 1554–1559, Dec. 31, 1994.

PROCESS AND APPARATUS FOR PREDICTING AND CONTROLLING FLOOD AND CARRYOVER CONDITIONS IN A SEPARATION COLUMN

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

TECHNICAL FIELD OF THE INVENTION

This invention relates generally to controlling the operation of a separation column. More particularly, this invention relates to systems and methods for not only optimizing capacity and predicting and controlling flooding and carryover in a separation column, but affecting improved separation even when the operation is running at less than capacity.

BACKGROUND OF THE INVENTION

During the operation of a separation column (also referred to as a separation tower) with trays (also referred to as decks or stages), conditions can arise, especially as a separation column is pushed toward capacity, which require some action to be taken in order to avoid flooding and carryover conditions. These conditions can lead to product degradation, down-time, increased operating costs, equipment failure, and reduced margin of safety.

Flooding and carryover occur on the trays which are present to affect a desirable contacting of the countercurrently flowing liquid and vapor streams within the column. At steady state, the composition of each tray is slightly different in that the lighter components are on the upper trays, while the heavier components are found on the lower trays.

A high pressure drop between the space in the trays can cause flooding. Specifically, flooding takes place when the liquid level on a tray builds up so much that the liquid vapor traffic (LVT) becomes impeded. Ultimately, the liquid level on one tray intermingles with the liquid level on another tray. This comingling causes the tray efficiency to fall to a low value, the flow of gas to become erratic, and may cause liquid to be forced out of the exit pipe at the top of the tower. As a result, the overhead product to start resembling the bottom product and the bottom product to start resembling the overhead product.

Carryover is generally considered to be a severe flooding condition wherein the liquid on the trays has built up significantly which causes the pressure below the trays to also increase. This pressure increase in turn causes the vapor velocity to decrease and the pressure to increase until the liquid on the tray is overcome such that the liquid becomes entrained in the vapor and is expelled overhead from the column along with the vapor. Specifically, a liquid drop is entrained when the upward vapor velocity exceeds the terminal velocity of the drop.

In some liquid-gas combinations which tend to foam excessively, high gas velocities may result in another inoperative condition known as priming. In this situation, the foam persists throughout the space between the trays, and a large amount of liquid is actually carried by the gas from one tray to the next. The carried liquid then recirculates between trays, causing the added liquid-handling load to increase the gas pressure drop in an amount sufficient to cause flooding.

One of the conventional methods for monitoring separation column flooding or carryover is to have a priming meter installed in the separation column to measure the pressure drop or differential pressure across certain sections of the separation column. In a refining operation, for example, one meter can be placed such that pressure drop can be measured across the top trays which contain essentially gasoline, another meter can be placed lower, in the area of light cycle gasoline, yet another meter can be placed in a lower area where the heavy cycle gasoline is present, and a fourth meter can be placed near the bottom of the separation column in the area of slurry.

A sharp increase in differential pressure across any one section of a separation column can indicate that the liquid level in the trays in that particular section is building which can indicate flooding or carryover is imminent. After noting a sharp increase in differential pressure as described above, an operator can adjust the operation of the separation column by reducing the feed rate or the reflux rate to the separation column, increasing the pressure above the trays in the separation column, or reducing the temperature of a reboiler or alternate heat source which supplies heat to the separation column.

Reducing the feed rate, i.e. charge to the separation column, will generally bring the separation column back into a stable condition, although such action obviously leads to a loss of profits as less product is being generated for a period of time. Furthermore, as there is no standard for determining the amount of reduction or the period of time for which to maintain the reduction, the separation column is not being operated at capacity.

Cutting the reflux rate will also help to stabilize the separation column as less liquid is being put back on a tray, but as there is again no standard for determining the amount of reduction or the period of time for which to maintain the reduction, the separation column is not being operated at capacity. Cutting the reflux rate also has the effect of causing some product quality to be lost temporarily, as less separation is occurring.

The resulting product degradation can lead to severe problems with separation operations not only downstream, but also in the separation column which is experiencing the flooding or carryover condition. These problems include equipment malfunctions such as pump cavitation and severe pump failure.

Regarding pump cavitation and pump failure, these types of problems begin when the pump loses suction from handling a liquid with a composition which is lighter than what the pump was designed to handle. Specifically, when this lighter liquid enters the impellers of the pump, the extremely low pressure present at the impeller can cause it to boil and change into a vapor. Thus, a partial vacuum is formed in the liquid by the swiftly-moving impeller. This can lead to vapor bubbles collapsing on the surface of the impeller, known as cavitation, which causes pitting of the surfaces of the pump or complete pump failure. This condition increases the risk of injury to personnel who may be nearby.

Increasing the pressure above the trays is accomplished by increasing the pressure in a separation column into which the overhead vapor is entering. As there is again no standard for determining the amount of increase or the period of time for which to maintain the increase, the separation column is not being operated at capacity. Furthermore, this action may not actually reduce the flooding or carryover condition, but may simply be holding the volatile liquid at a point just prior to flashing or vaporization. Also, increasing the pressure above the trays can cause a number of problems including the necessity of using high fan power to blow or draw the gas through the separation column, leading to higher operating costs. In certain separation operations, such as distillation, high pressure at the bottom of the tower results in high boiling temperatures, which in turn may lead to difficulties with heating and possible damage to the heatsensitive compounds. Any type of product degradation can in turn again cause difficulties in operations downstream as described above., which is known as product degradation.

Often, the solution is to reduce the reboiler temperature for a few minutes, which will bring the separation column back into a stable pattern by effectively reducing the separation column bottom temperature. This action does nothing to optimize separation column operation as there is no standard temperature reduction amount or standard period of time for which the temperature should be reduced.

The prevention of flooding and carryover is totally dependent on operator alertness. Since action is often not taken until after flooding or carryover has occurred, the problems with product degradation, downtime, equipment failure, as well as a reduced margin of safety will be encountered.

Current advanced control computerized operations for separation columns are based on multi-variable predictive controller systems. A multi-variable predictive controller system is designed according to textbook information, i.e. information rooted in scientific knowledge. The inferential techniques used in this system attempt to predict process properties that are not directly measured, and relies on these predictions to generate operating procedures. Specifically, predictive modelling is utilized which allows a prediction of how a particular feed material, for example, will behave at a given temperature and pressure. Based on these predictions, i.e. scientific knowledge, reflux rates, column pressure, and a reboiler temperature, for example, can be calculated for the ideal situation.

The difficulty with this approach is that the predictive models are only accurate if the feed composition remains unchanged, which occur only in situations where the quality of feed can be controlled. When the feed composition changes, the models are of little, if any value. As feed compositions normally vary considerably during the operation of a separation column, especially in separation operations where the source of feed stock is dependent upon available crude stocks, a multi-variable predictive control system is of extremely limited value. Thus, not only is the operation not optimized, flooding and carryover conditions can occur frequently. Operating a separation column at less than optimal conditions can result in a loss of about $1 million per year in a $10 million per year operation. Also, the cost of products which are off-specification as a result of flooding or carryover events can be about $300,000 per year for a $10 million per year operation.

Thus, what is needed is an efficient and economical method to optimize column capacity while eliminating flooding and carryover conditions, and to affect improved separation even when the operation is running at less than capacity.

SUMMARY OF THE INVENTION

The present invention is a closed loop artificial intelligence strategy which exploits the derivative properties of variables used to determine the direction the process is going. More specifically, it is a rule-based expert system that identifies a separation column's approach to flooding or carryover, i.e. a pattern-recognition system. The present invention further initiates corrective action to move the separation column away from these adverse conditions and toward stability.

This is unlike conventional multivariable predictive control strategies which are based on a multi-variable predictive controller system. A ruled-based expert system duplicates the thinking process of an expert in a particular field. Specifically, the expert is consulted for information on his approach to solving problems which takes into account intuitive bases for decision-making. This approach provides for greater latitude in solving problems. Specifically, this invention employs a pattern recognition system to identify transient instabilities which have been discovered to precede tray flooding and carryover conditions.

This invention provides a process for identifying pre-flood and pre-carryover conditions in a separation column operation comprising the steps of:

(a) determining at least two measurable process variables to be monitored;

(b) calculating a rate of change for each measurable process variable;

(c) assigning a rate of change alarm to each measurable process variable; and (d) identifying a synchronous rate of change in at least two of the measurable process variables which corresponds to a preflood condition or a pre-carryover condition.

The invention further provides for reducing the reboiler temperature for a period of time to relax the liquid vapor traffic (LVT) sufficiently to cause the pre-flood or pre-carryover condition to disappear. In a few minutes, the flooding and carryover predictor removes the temperature constraint on the reboiler temperature controller and the reboiler temperature is returned to normal. Other remedial measures, depending on specific operational constraints, can include reducing the feed rate, cutting the reflux rate or rates, and raising the separation column pressure.

The method and apparatus of the present invention identifies two patterns which occur prior to virtually every adverse condition. One pattern occurs in a pre-flooding condition when there is a slight increase in the separation column bottom temperature derivative and separation column differential pressure derivative occurring at the same time as a slight decrease in the separation column bottom product flow derivative from the separation column. The other pattern occurs during a pre-carryover condition where there is a slight increase in the separation column bottom temperature derivative at the same time as a slight increase in separation column overhead fuel gas flow derivative. Alternatively, the temperature in the return line from the reboiler can be monitored rather than the separation column bottom temperature, as the pattern is identical. Furthermore, the liquid level in the bottom of the separation column can be monitored rather than the separation column bottom product flow, as the pattern is also identical in this case.

Since each of these excursions or variations are well within conventional high and low alarm limits, there is never an indication that a problem exists. Until now, these excursions were not noticed as representing any type of pattern nor has any method been developed by which these excursions could be correlated even if the pattern among them was apparent.

Flooding and carryover do not occur at a certain temperature, flow rate or pressure. On the contrary, a flood or carryover can occur in one instance when the separation column bottom temperature is at about 115° C. (240° F.), yet in another instance, a flood does not occur even when the separation column bottom temperature is at about 120° C. (248° F.). Generally, conditions present at one flooding or carryover event are not present at the next event, primarily because of inconsistent feed quality.

All separation column variables experience constant fluctuations. Flows, pressures, levels and temperatures are in a constant state of flux. Prior to flooding or carryover, however, one of two conditions occur, as described above, at which time the random behavior of these variables disappear momentarily and an identifiable pattern emerges. During this momentary pattern representing imminent flooding or carryover, the rate of change of each of the aforementioned variables changes in concert, and thus the derivative values are used to predict and eliminate flooding.

In a preferred embodiment of the present invention, a strategy is provided to optimize and increase the margin of safety in operations in a separation column by not only identifying imminent pre-flooding or pre-carryover conditions, but also identifying early pre-flooding or pre-carryover conditions.

The strategy of the present invention is unlike conventional separation column control systems in which corrective measures are taken either only after flooding or carryover has occurred or are taken in such a haphazard manner as to cause the separation column to run at a much lower capacity than it otherwise could be operated.

These and other features, aspects, and advantages of the present invention will become better understood with regard to the following description, example, appended claims and accompanying drawings.

DETAILED DESCRIPTION OF THE INVENTION

Figure 1A:
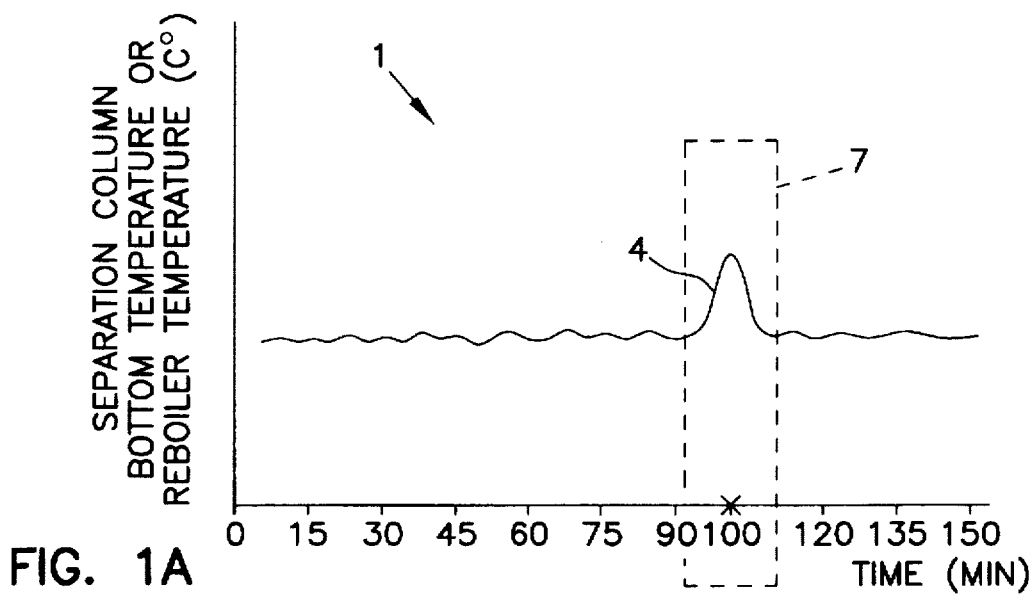
FIG. 1 is an example of a plot of the measurable process variables which change over time during a pre-flood condition.

Separation operations are used in many industries, particularly the petroleum and chemical industries. There are many types of separation operations including those performed in a gas-absorption column, a desorption or stripping column, or a liquid-liquid extraction column. The separation occurs between phases which may be miscible, immiscible, or partially miscible. The operation can be run with concurrent flow, countercurrent flow or even cross flow. The tower design can be a packed tower or an unpacked spray tower for liquid-liquid operations, both of which operate in such a way that the phases are in continuous contact.

Alternately, the operation can be performed such that the interphase contacting is done countercurrently in trays where the contact between the phases as they move through the device is intermittent rather than continuous. The trays can be of any suitable type such as a bubble-cap tray or a sieve tray. In an ideal, or equilibrium stage, the phases are mixed long enough so that the streams leaving the stage are in equilibrium, with the phases being mixed so thoroughly that there are no "gradients" of concentration in them. By contrast, in a real stage, there may not be sufficient contact between the phases to bring the streams into equilibrium. Such a stage accomplishes less interphase transfer than an ideal stage, and is said to be less efficient than an ideal stage.

The separation of binary or multicomponent mixtures can be performed in stages by the technique of distillation. Distillation is a process that consists of driving gas or vapor from liquids or solids by heating and condensing to liquid products and that is used especially for purification, fractionation, or the formation of new substances. Fractionation is used to separate a mixture or a feed stock into different portions or components.

The simplest distillation operation is known as batch distillation and can be carried out using a still, i.e. a one stage system, which is equipped with a heating coil or a steam jacket. A more complex distillation apparatus is the fractionating column. In a fractionating column, liquid reflux must be added at the top of the column, with the liquid usually being supplied by condensing part of the overhead vapor, although the source of reflux can be from any suitable external source. The internal construction of a fractionating column must be such that the vapor and liquid are brought into successive contact as the two phases move generally countercurrent in the column. Such construction can consist of packing materials such as fixed beds of Berl saddles, Raschig rings, or some other type of packing commonly used in gas absorption. Typically, however, the construction consists of a series of any suitable type of tray.

The fractionating column usually operates under about steady state conditions and contains numerous trays with each one at about an equilibrium stage. A batch still can be combined with a fractionating column by having the vapors from the batch still enter up into the fractionating column. In this way, the batch distillation is performed with a plurality of stages operating simultaneously. The composition at any one point in the fractionating column is a function of time. The system is operated for a period of time sufficient to produce the required cumulative overhead and residual products.

Fractional distillation columns are employed in the petroleum industry, for example, to make desired separations of composite petroleum products in separate petroleum fractions, generally designated by a range of boiling point temperatures. The feed entering the column may be a saturated liquid, a saturated vapor, a mixture of both liquid and vapor, a subcooled liquid, or a superheated vapor. The separations may range from single component separations to the more complex multiple separations performed by crude distillation columns.

In refinery distillation processes, one or more feed streams containing at least two petroleum fraction components are supplied to a fractional distillation column. If the feed is supplied such that trays are present both above and below the feed injection point, the column is technically known as a complete fractionating column. For simplicity, however, the term fractional distillation column will be used herein. Heat is normally supplied to the fractional distillation column in order to effect the desired separation, by means of a reboiler or a heating coil connected to the lower portion of the fractional distillation column. Reflux is normally returned to the top of the fractional distillation column in a regulated quantity suitable for rectification within the upper portion of the fractional distillation column.

Within the fractional distillation column, a portion of the feed stream comprising a lighter petroleum fraction is withdrawn as an overhead product and another portion of the feed stream comprising a heavier or "reduced" petroleum fraction is withdrawn from the bottom of the fractional distillation column. In fractional distillation columns, such as crude fractional distillation columns, where more complex separation is being performed, not only can side products be withdrawn at a variety of vertical locations along the height of the fractional distillation column, but there can also be multiple reflux streams entering the column at various locations as well.

Flooding and severe flooding, i.e., carryover, conditions are recognized as major problems in separation operations, including fractional distillation operations in refineries, as until now, a maximum stable operating rate has been very difficult to define as compared with the minimum stable operating condition for trays. The flooding and carryover predictor of the present invention is unlike conventional separation column control systems in which corrective measures are taken either only after flooding or carryover has occurred or are performed in such a way as to affect downstream operations, reduce the margin of safety, and cause the system to run at less than optimal conditions. Furthermore, until now, carryover has been considered to be of only one type, namely a severe flooding condition. Carryover, however, can also be caused by the presence of an extremely thin layer of liquid on a tray which causes the vapor velocity to increase such that the liquid becomes entrained in the vapor and is expelled from the separation column along with the vapor. This invention, therefore, recognizes not only a pre-flood condition (which includes flooding and the conventional definition of carryover, i.e. severe flooding), but also a "pre-carryover condition", both of which exist when slight increases in rates of change for certain measurable process variables occurs simultaneously.

The rate of change of a given measurable process variable can be referred to as a derivative of that variable. For a plot of values of a given variable over time, with the value of the variable on the y-axis and time on the x-axis, the derivative is considered to be the slope of a line which is greater or less than zero (0). If the derivatives of certain variables show a sudden increase or decrease, i.e. if the slope of a given line becomes more positive or more negative, simultaneously, then a pre-flooding or pre-carryover condition is considered to be occurring. This sudden increase or decrease can be a very slight change or a larger change. The actual rate of increase or decrease is not important, rather the fact that these increases occur simultaneously is what is critical, and identifies the pattern which until now, has not been recognized.

Referring to FIG. 1, an example of a plot of the measurable process variables which change during a pre-flood condition are shown. The value of the measurable process variable is shown on the y-axis and time in minutes is shown on the x-axis. The measurable process variables which are monitored over time are the separation column bottom temperature or reboiler temperature 1, separation column differential pressure 2, and separation column bottom product flow 3. As is shown, the positive derivative 4 (or slope) of the separation column bottom temperature or reboiler temperature, the positive derivative 5 of the separation column differential pressure and the negative derivative of the separation column bottom product flow 6 are all occurring simultaneously. This occurrence 7 is now recognized as a pre-flood condition.

Referring to FIG. 2, an example of a plot of the measurable process variables which change during a pre-carryover condition are shown. The value of the measurable process variable is shown on the y-axis and time in minutes is shown on the x-axis. The measurable process variables which are monitored over time are the separation column bottom temperature or reboiler temperature 8 and separation column overhead fuel gas flow 9. As is shown, the positive derivative 12 of the separation column bottom temperature or reboiler temperature and the positive derivative 10 of the separation column overhead fuel gas flow are occurring simultaneously. This occurrence 11 is now recognized as a pre-carryover condition.

The various transducing devices used to measure parameters which characterize the pre-flooding and pre-carryover conditions and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic control elements in conjunction with electrical analog signal handling and translation apparatus, the apparatus and method of the invention can be implemented using a variety of specific equipment available to and understood by those skilled in the process control art.

In a preferred embodiment a Honeywell DCS-3000 (distributed control system) is used wherein the various equipment which is used to monitor the separation operation (control valves, thermocouples, flow meters and pressure meters) communicate with their circuit boards in an input/output (I/O) cabinet. The circuit boards then communicate on a "Hiway" to the local control network (LCN) on which is located the computer module, in which the source code for advanced controls reside as well as the operator interface and history module. Alternatively, the source code, operator interface, and history module can reside on either a personal computer which is equipped a suitable interface with the Honeywell DCS-3000 system, or on a personal computer alone.

Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate.

Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Figure 3:
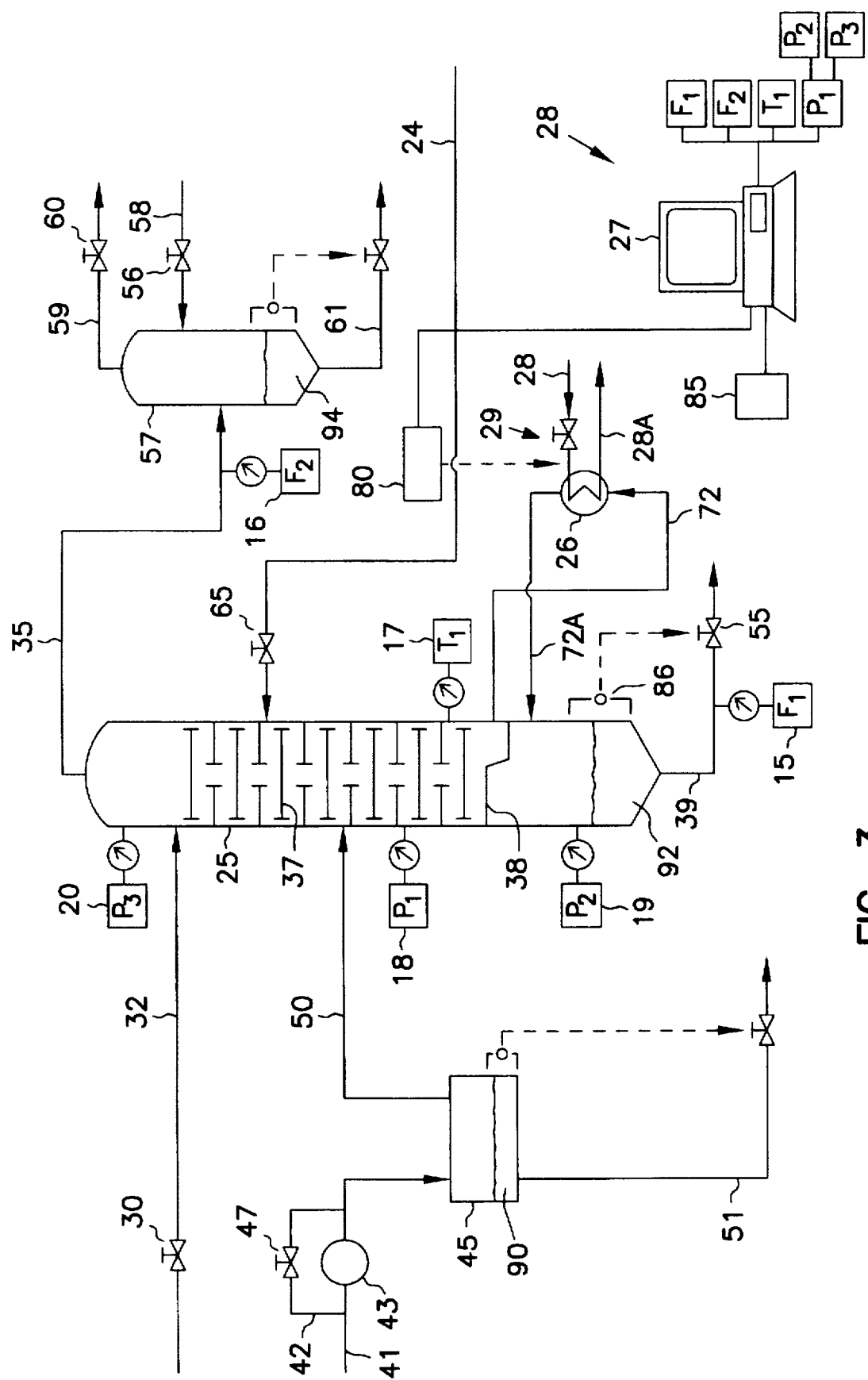
FIG. 3 is a simplified schematic illustration of a typical de-ethanizer separation column and its associated control system for operating the separation column in accordance with one embodiment of the present invention.

Referring to FIG. 3, a portion of a fractional distillation process which is typical of a portion of a refinery operation is shown. Specifically, a de-ethanizer 25 is shown with a control system 28 in place for predicting and controlling flooding and carryover conditions. The de-ethanizer 25 is operated at about 13 kg/cm$^2$ (185 pounds per square inch {psi}), has no overhead condenser, is heated through use of a reboiler which is supplied with steam injection 28, has a source of feed in line 32, which also serves as a source of external reflux, a second source of feed in line 50, and a second source of external reflux in line 24. Preferably the control system 28 includes a computer module 27 coupled to several devices to monitor certain variables, output information regarding variable levels, and take corrective action if the synchronous rate of change of the variables, i.e. the derivatives, exceed a predetermined amount.

Specifically, a first flow sensing device (F1) 15, preferably a flow meter, is coupled to the computer module 27 to monitor the flow rate of the de-ethanizer bottom product in line 39. There is also a second flow sensing device (F2) 16 coupled to the computer module 27 to monitor the flow rate of the overhead fuel gas in line 35. There is a temperature sensing device (T1) 17, preferably a thermocouple, coupled to the computer module 27 to monitor the temperature of the liquid in the bottom of the separation column, i.e. the separation column bottom temperature. Alternatively, the temperature sensing device 17 (T1) can be located in line 72A which returns heated bottom product to the de-ethanizer 25. Finally, there is a first pressure sensing device (P1) 18 to monitor the differential pressure across the separation column in the de-ethanizer 25. This measurement is made by subtracting the value of the measurement obtained at the bottom of the column with a second pressure sensing device or meter (P2) 19 from the value of the measurement obtained at the top of the column with a third pressure sensing device (P3) 20.

The source of feed stock in lines 32 and 50 can be from any suitable source, including separation operations upstream from the de-ethanizer 25. Operations which precede this type of de-ethanizer 26 can include, for example, a separation operation which separates crude oil in a crude still. Crude oil can contain everything from $C_1$ to $C_{100}$, or greater. In the crude still, crude oil is split into a bottom product of heavy asphalt and an upper vapor product. The upper vapor product enters a catalytic cracking fractionater where it is separated into five (5) product streams through use of a catalyst. The uppermost product comprises about 70% of the five (5) products and is an intermediate product referred to as wild gasoline. Wild gasoline consists of hydrocarbons of about $C_4$, $C_5$, and $C_6$, with trace amounts of $C_2$'s, $C_3$'s, $C_7$'s, and $C_8$'s. The second and third highest intermediate products, respectively, are wet gasoline and light cycle gasoline oil (LCGO). Wet gasoline consists of hydrocarbons of about $C_1$, $C_2$, and $C_3$ with trace amounts of $C_4$'s and $C_5$'s. LCGO consists of hydrocarbons of about $C_8$'s, $C_9$'s, $C_{10}$'s, $C_{11}$'s, and $C_{12}$'s with trace amounts of $C_7$'s, $C_8$'s, $C_{13}$'s, and $C_{14}$'s.

A liquid stream of the wild gasoline is cooled to about 30° C. (85° F.) to about 50° C., (122° F.), typically about 38° C. (100° F.), and flows at about 180 m$^3$/hour (1,500 barrels per hours (bph}) through a flow controller 30 in line 32 to the extreme upper portion of the de-ethanizer 25. The wild gasoline in line 32 enters the de-ethanizer 25 at a pressure slightly higher than the pressure of the de-ethanizer 25. The wild gasoline serves as a source of feed stock and external reflux to the de-ethanizer 25. Within the de-ethanizer 25, the wild gasoline is separated into an overhead fuel gas and exits the de-ethanizer 25 in line 35. The overhead fuel consists of primarily $C_1$'s and $C_2$'s with trace amounts of $C_3$'s and a heavier component of primarily $C_3$'s which cascades down the trays 37 in the de-ethanizer 25, and exits along line 39 as a de-ethanizer bottom product.

A vapor stream of wet gasoline flows at about 215 m$^3$/hr to about 335 m$^3$/hr (1,800–2,800 bph) in line 41 through a condenser 43 into a feed drum 45. The wet gasoline is temperature-controlled by having a portion flow in line 42 through temperature control valve 47. The feed drum 45 is maintained at a temperature of about 35° C. (95° F.) to about 52° C. (125° F.), typically about 46° C. (114° F.). The temperature is controlled such that only $C_3$'s are condensed in the feed drum 90 and the $C_1$'s and $C_2$'s remain in vapor form to enter the lower portion of the de-ethanizer 25 along line 50 at a temperature of about 24° C. (75° F.) to about 52° C. (125° F.) and a flow rate of about 6,300 liter/sec/min (800 MSCFH {one thousand standard cubic feet per hour}) to about 11,800 liter/sec/min (1,500 MSCFH). In this way, the relatively light vapors in line 50, which are at a pressure higher than the de-ethanizer 25, travel upwardly upon entering the de-ethanizer 25. These relatively light vapors are further separated into lighter and heavier components during contact with the heavier components of the wild gasoline which is travelling down through the de-ethanizer 25. The $C_3$'s exit the feed drum 45 along line 51 for use as feed in a fractionating tower downstream known as a de-propanizer.

The de-ethanizer bottom product 92 composed primarily of $C_3$'s, $C_4$'s, $C_5$'s, $C_6$'s, with trace amounts of $C_7$'s, and $C_8$'s passes through a partial trapout pan 38 which is a type of filter to catch the liquid which is supplied as reboiler supply liquid in line 72. In a separation column operation which has no reboiler, a total trapout pan is used to prevent higher quality lighter material from being entrained with bottom material of less value. The de-ethanizer bottom product 92 exits the de-ethanizer 25 at a pressure less than the pressure in the de-ethanizer 25, and a temperature of about 66° C. (150° F.) to about 120° C. (250° F.). The de-ethanizer bottom product 92 flows along line 39 through a flow controller 55 for use as feed to a fractionating tower downstream known as a de-butanizer or lean oil still. There is also a level controller 86 which is set to maintain a certain level of de-ethanizer bottom product 92, preferably about 50%. The level controller 86 outputs information to the flow controller 55 which responds by decreasing flow or increasing flow, depending on the input received. The flow rate of the de-ethanizer bottom product in line 39 is about 215 m$^3$/hr to about 310 m$^3$/hr (1800–2600 bph) and is monitored with the flow sensing device (F1) 15 as described herein.

The overhead fuel gas in line 35 exits the top of the de-ethanizer at a pressure less than the de-ethanizer 25, a temperature of about 24° C. (75° F.) to about 66° C. (150° F.) and flows at a rate of about 3,150 liter/sec/min (400 MSCFH) to about 7,100 liter/sec/min (900 MSCFH) to a sponge oil tower 57. The flow in line 35 is monitored with the flow sensing device (F2) 16 as described herein. The sponge oil tower 57 is provided with a flow of lean light cycle gas oil (LCGO) at a pressure slightly higher than the de-ethanizer 25, a temperature of about 38° C. (100° F.) to about 120° C. (250° F.) flowing at a rate of about six (6) m$^3$/hr to about 24 m$^3$/hr (50 to 200 bph) from a fluid catalytic cracking fractionater through a flow controller 56 along line 58. The LCGO enters the upper portion of the sponge oil tower 57 and flows counter-currently to the overhead fuel gas such that the trace $C_3$'s are absorbed in the LCGO. The overhead fuel gas is thereby separated into a vapor flow of fuel gas comprised of primarily $C_1$'s and $C_2$'s which exits the sponge oil tower 57 along line 59, through control valve 60 and a bottom flow of enriched LCGO 94 which returns to the catalytic fractionater along line 61. Control valve 60 controls the pressure of the entire operation depicted in FIG. 3.

The source of the lean oil in line 24 is from the downstream de-butanizer or lean oil still. The lean oil is at a pressure higher than the de-ethanizer, a temperature of about 38° C. (100° F.) to about 93° C. (200° F.) comprised of primarily $C_5$, $C_6$'s, and $C_7$'s with trace amounts of $C_4$'s and $C_8$'s, and flows through a flow controller 65 in line 24 at about twelve (12) m$^3$/hr to about 90 m$^3$/hr (100–750 bph). This rate of flow is about twelve (12) m$^3$/hr to about 24 m$^3$/hr (100–200 bph) higher than when this process is run without the control system 28 in place. This high flow rate of the lean oil helps to improve product quality but can push the de-ethanizer closer to a pre-carryover or pre-flood condition. For that reason, the flow rate of the lean oil in line 24 is typically maintained closer to about twelve (12) m$^3$/hr (100 bph) to about 36 m$^3$/hr (300 bph). If the preferred process of the present invention is utilized, as described in FIG. 5, the flow rate of the lean oil in line 24 can be maintained much higher without the concern of reaching a pre-flood or pre-carryover condition.

The de-ethanizer bottom temperature is maintained by a reboiler system 26, preferably a common multipass shell and type heat exchanger. A reboiler supply liquid comprised of about $C_3$'s, $C_4$'s, $C_5$'s and $C_6$'s, with trace amounts of, $C_2$'S, $C_7$'s, and $C_8$'s is drawn off near the lower end of the de-ethanizer and flows through line 72 into the reboiler system 26. The reboiler supply liquid then flows through the shell side of the heat exchanger. A heat source 28, typically steam or high temperature oil flows through a control valve 29 into the tube side of the heat exchanger and exits as cooled steam and/or condensate 28A. As the temperature of the reboiler supply liquid increases to about 80° C. (175° F.) to about 120° C. (250° F.), it flashes to a vapor and returns along line 72A as a reboiler return vapor to the de-ethanizer 25, at a point lower than the reboiler supply liquid being drawn off in line 72, thus providing a source of heat for the de-ethanizer 25. If the de-ethanizer bottom temperature falls, a reboiler temperature controller 80 which is also coupled to the computer module 27 increases the amount of heat source to the tube side of the reboiler system 26. This action increases the temperature of the reboiler supply vapor returning to the separation column along line 72A, which in turn increases the de-ethanizer bottom temperature and liquid vapor traffic (LVT) up the separation column.

When a flood or carryover is predicted, the alarm system 85 is activated, and the temperature controller 80 reduces heat to the reboiler by a suitable percentage for a suitable time period. Preferably the heat is reduced by about ten (10))% to about 40% for about ten (10) minutes to about 20 minutes, respectively. More preferably the heat is reduced by about 20% for about five (5) minutes.

The alarm system 85 monitors each of the previously described sensing devices, 15, 16, 17, and 18, and is activated when the rate of change, i.e. the derivatives exceed a predetermined amount. Depending on whether the condition is a pre-flood or a pre-carryover condition, different alarms will be activated.

An example of the alarm points in the operation of the system of the present invention in the de-ethanizer column is as follows:

De-ethanizer bottom temperatur: +0.02° C./min (+0.05° F./min)

De-ethanizer bottom product flow: −0.84 m$^3$/min/min (−7.0 bph/min)

De-ethanizer differential pressure: +0.002 kg/cm$^2$/min (+0.03 psi/min)

De-ethanizer overhead fuel gas flow: +47.2 liter/sec/min (+6.0 MSCFH/min)

As previously noted, the temperature in the reboiler return line 72A can alternately be monitored rather than the de-ethanizer bottom temperature. Also, the liquid level of the de-ethanizer bottom product 92 can be monitored rather than the de-ethanizer bottom product flow in line 39.

The invention will be further described by reference to the following example which is offered to further illustrate another embodiment of the present invention. It should be understood, however, that many variations and modifications may be made while remaining within the scope of the present invention.

EXAMPLE

The pattern-recognition method of the present invention can also be utilized on a stripping column. A stripping column typically has feed supplied to the top of the column as a saturated liquid, and the overhead product is the vapor rising from the top plate. Although this vapor is somewhat richer in terms of the more volatile component than is the feed, it is not usually of very great purity. Typically, the only stream leaving the stripping column which has a high concentration is the saturated liquid bottom product.

Although it is possible to monitor the same measurable process variables as previously discussed in FIG. 3, it is also possible for the flood and carryover predictor to be operated monitoring slightly different measurable process variables. Specifically, instead of measuring the stripping column bottom product flow, the liquid level in the bottom of the stripping tower can be monitored. Furthermore, the feed rate entering the tower can also be monitored. The other measurable process variables can remain the stripping column bottom temperature (or the reboiler temperature), the stripping column differential pressure, and stripping column overhead fuel gas flow A pre-flood condition exists when the stripping column bottom temperature (or reboiler temperature) derivative and stripping column differential pressure derivative increases simultaneously with a decrease in the stripping column liquid level derivative. A pre-carryover condition may exist when the stripping column bottom temperature (or reboiler temperature) derivative increases simultaneously with an increase with the stripping column overhead flow, or when the stripping column feed rate derivative increases simultaneously with an increase in the stripping column bottom temperature.

Although this example has been described in terms of a stripping column, the liquid level can be the measurable process variable which is monitored in any other type of separation operation. Furthermore, by monitoring the liquid level, this particular embodiment of the present invention provides an alternative to those separation operations which do not have a flow controller on the bottom product line.

Figure 4:
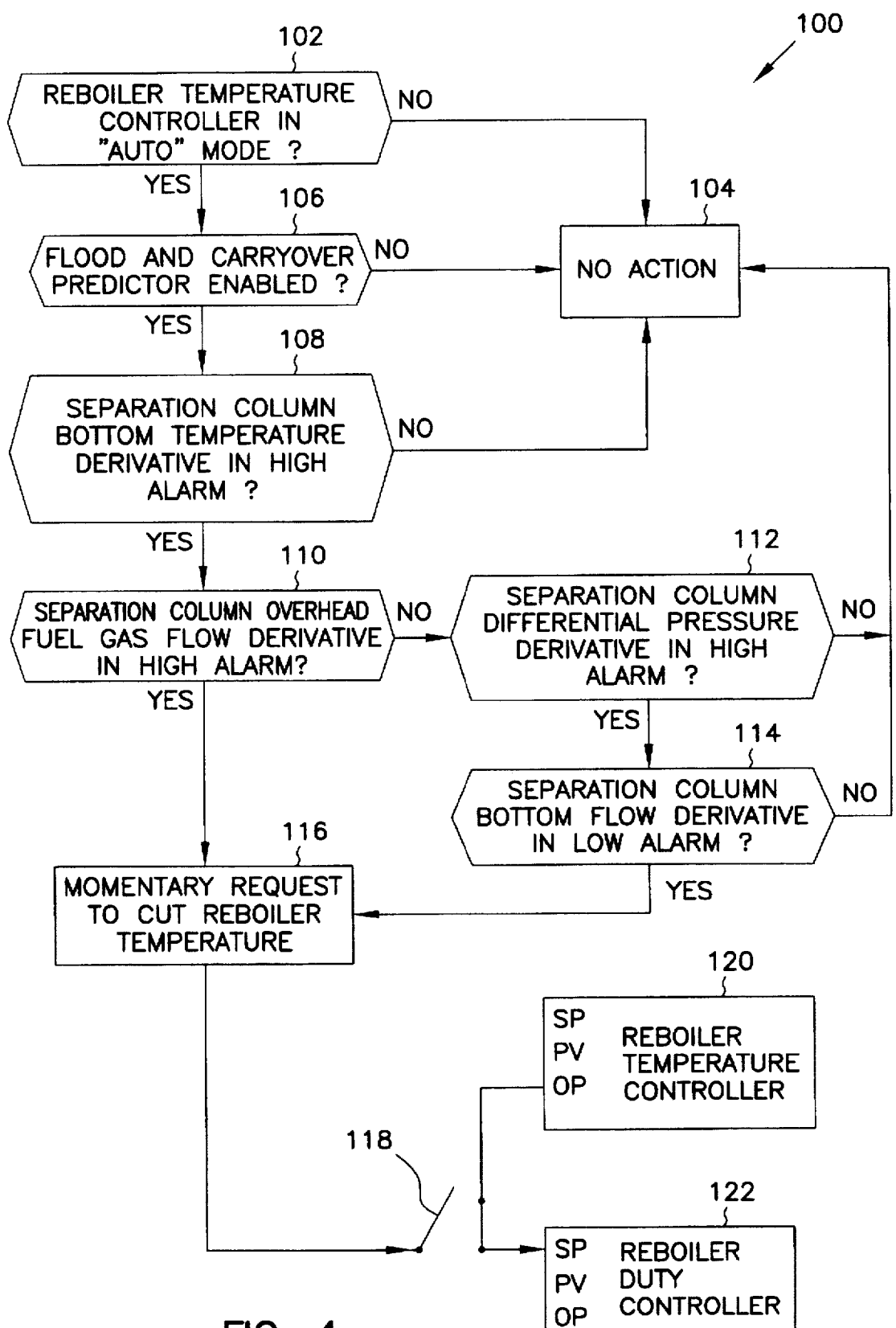
FIG. 4 is a flow diagram of one embodiment of the process of the flood and carryover predictor method of the present invention.

Referring to FIG. 4, a process of one embodiment of the present invention 100 is shown which details the operation of the flood and carryover predictor when a pre-flooding or pre-carryover condition is present. The process begins with a determination 102 as to whether the reboiler temperature controller is in automatic mode. Automatic mode is defined as a state in which the reboiler temperature controller, possessing a set point (SP), process variable (PV), and an output (OP) will generate a change to the OP if an error (difference) occurs between the PV and the SP. For example, if the current SP is about 82° C. (180° F.) and the PV falls to about 80° C. (176° F.), the OP to a subordinate control valve or subordinate controller, such as a reboiler duty controller, will increase in order to bring the PV back up to SP. In contrast, if the PV increases, the signal or OP will decrease to the subordinate controller in order to bring the PV back down to SP.

If the reboiler temperature controller is not in automatic mode, no action 104 can be taken as the flood and carryover predictor is not on. If the reboiler temperature controller is in automatic mode, a determination 106 is made as to whether the flood and carryover predictor is enabled. This simply means that the pattern recognition element of the present invention is in good working order and turned on. One reason for disabling the pattern recognition element can occur if one of the four sensing devices has experienced a mechanical failure or if it is temporarily out of service for repairs.

If the flood and carryover predictor is not enabled, no action 104 can be taken as the flood and carryover predictor is not on. If the flood and carryover predictor is enabled, a determination 108 is made as to whether the separation column bottom temperature derivative is in "high" alarm. A derivative has previously been defined herein (See FIGS. 1 and 2) and is simply a reference to a rate of change of the variable being monitored. For example, in one type of operation where the separation column is a de-ethanizer, high alarm preferably refers to a rate of change equivalent to an increase of about 0.02° C./min. (0.05° F./min), although in a different separation operation the high alarm for the separation column bottom temperature derivative may be set much differently. It should also be noted that instead of monitoring the separation column bottom temperature derivative, the reboiler temperature derivative could alternatively be measured.

If the separation column bottom temperature or the reboiler temperature derivative is not in high alarm, no action 104 is required. If the separation column bottom temperature derivative is in high alarm, a determination 110 is made as to whether or not the separation column overhead fuel gas flow derivative is in high alarm. For example, in one type of operation where the separation column is a de-ethanizer, high alarm preferably refers to a rate of change equivalent to an increase of about 47.2 liter/sec/min (6.0 MSCFH/min), although in a different separation operation the high alarm for the separation column overhead fuel gas flow derivative may be set much differently.

If the separation column overhead fuel gas flow is not in high alarm, a determination 112 is made as to whether the differential pressure derivative is in high alarm. For example, in one type of operation where the separation column is a de-ethanizer, high alarm preferably refers to a rate of change equivalent to an increase of about 0.002 kg/cm²/min (0.03 psi/min), although in a different separation operation the high alarm for the separation column overhead fuel gas flow derivative may be set much differently. If it is not in high alarm, no action 104 is required.

If the separation column overhead fuel gas flow derivative is in high alarm, a determination 114 is made as to whether the de-ethanizer bottom product derivative is in low alarm. For example, in one type of operation where the separation column is a de-ethanizer, low alarm preferably refers to a decrease of about −0.84 m³/min/min (−7.0 bph/min), although in a different separation operation, the low alarm for the separation column bottom product derivative may be set much differently. If the de-ethanizer bottom product derivative is not in low alarm, no action 104 is required. If it is in low alarm, a momentary request 116 is made by the flood and carryover predictor to cut the reboiler temperature.

If the separation column fuel gas flow 110 is in high alarm, the momentary request 116 is made to cut the reboiler temperature. This request means that the OP from the reboiler temperature controller is interrupted for a certain period as the reboiler duty controller is reduced. For example, in one type of operation where the separation column is a de-ethanizer, the reboiler duty controller is cut for preferably twenty (20)% for about five (5) minutes. In a different type of separation column operation, the time and percentage of the cut in reboiler temperature may vary considerably. The flood and carryover predictor immediately begins relaxing control incrementally over the interrupted period, preferably the five (5) minutes, so that after the period has expired, the reboiler duty SP has been returned to the numerical value prior to the interruption.

If no flooding condition is present, the gate 118 is open, and the process is run in a conventional manner. The separation column bottom temperature controller 120 sends an OP which is the input SP to the reboiler duty controller 122. The reboiler duty is a calculation of BTU's based on heat supplied by steam or other heating source. At a given feed rate the duty required to maintain a given temperature is fixed. When the feed rate is increased, the reboiler duty must increase in order to maintain the same temperature and vice versa.

Figure 5:
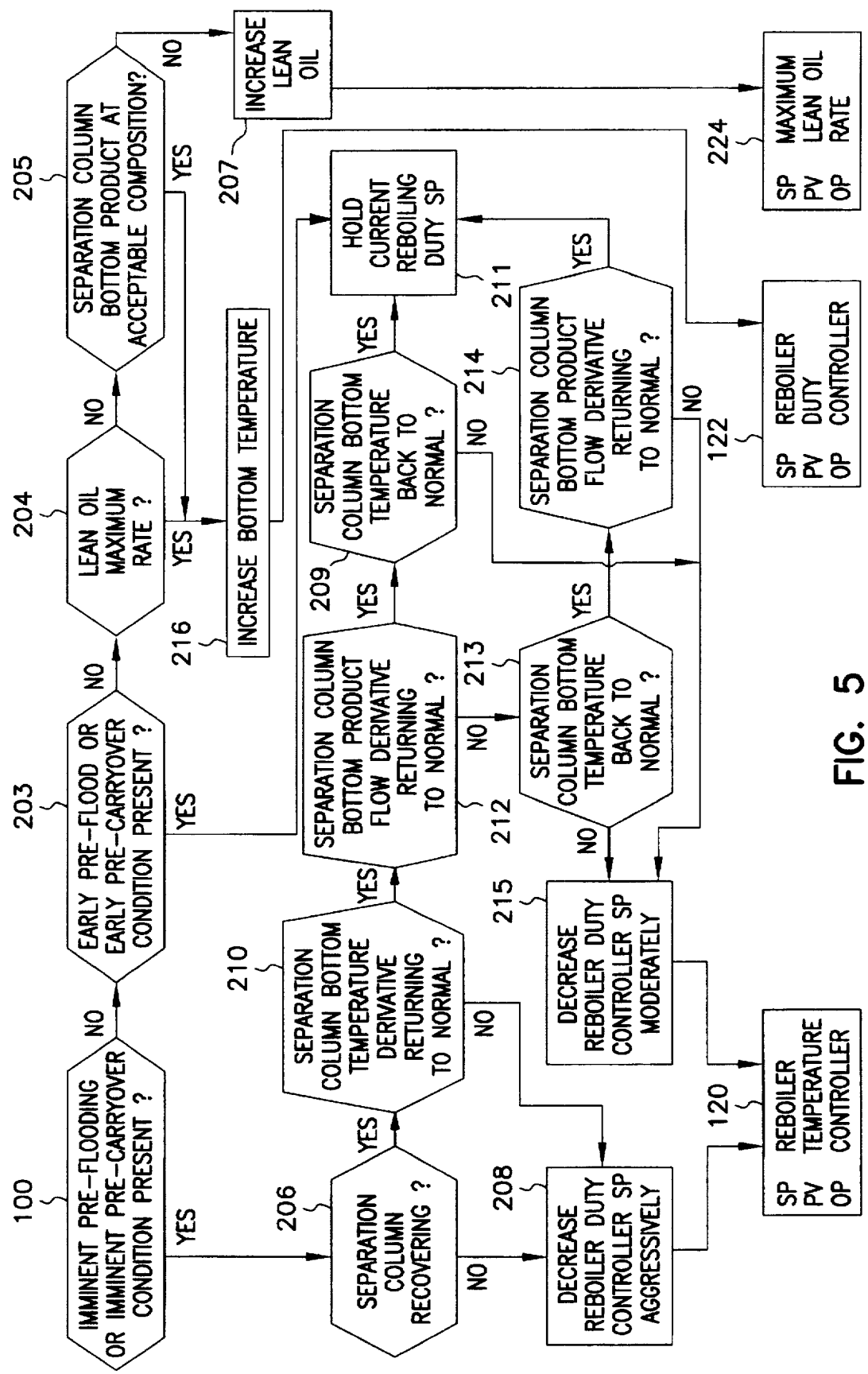
FIG. 5 is a flow diagram of a preferred process of the flood and carryover predictor method of the present invention which comprises an optimization component.

Referring to FIG. 5, a preferred process of the present invention 200 is shown. In this embodiment, an optimization component is included which not only allows a separation column to be run at maximum capacity, or even beyond what is conventionally considered to be maximum capacity, while maintaining a higher margin of safety, but affects increased separation even when the separation column is not at capacity. There is a higher margin of safety, i.e. a higher margin of mechanical and personal safety due to the virtual elimination of flooding and carryover conditions which by there very nature are considered "upset" conditions, which can lead to mechanical failure of pumps, pipes, reboilers and control valves. Consequently, the likelihood of personal injury is significantly reduced if none of the aforementioned mechanical failures are occurring.

In this preferred embodiment it is therefore necessary to make a distinction between "imminent" pre-flood and "imminent" pre-carryover conditions, and "early" pre-flood and "early" pre-carryover conditions. "Imminent" pre-flood and "imminent" pre-carryover conditions are considered to be those conditions which have been referred to herein as simply pre-flood and pre-carryover conditions. These are the conditions which have been described in the embodiment shown in FIG. 3 and the process 100 detailed in FIG. 4. "Early" conditions describe a point in time prior to the "imminent" conditions in that the increase or decrease in the derivatives being monitored are just beginning to manifest themselves, rather than having developed to a more clearly defined level.

This preferred process 200 begins with a determination 100 as to whether or not an imminent pre-flooding or imminent pre-carryover condition is present. Imminent pre-flooding conditions are manifested, therefore, by the simultaneous activation of the high separation column bottom temperature derivative alarm, the high separation column differential pressure derivative alarm, and the low separation column bottom product derivative alarm. Imminent pre-carryover conditions are manifested by the simultaneous activation of the high separation column bottom temperature derivative alarm and the high separation column fuel gas flow alarm. If an imminent pre-flooding or a imminent pre-carryover condition is not present, a determination 203 is made as to whether or not an early pre-flood or an early pre-carryover condition is present.

If an early pre-flood or early pre-carryover condition is not present, a determination 204 is made as to whether or not lean oil, i.e. separation column upper reflux from an external source, 204 is already at its maximum rate. In the de-ethanizer operation described in FIG. 3, the composition of the lean oil in line 24 is primarily $C_5$'s, $C_6$'s, and $C_7$'s. If the lean oil is at its maximum rate, the separation column bottom temperature will be increased 216 to the process limit. The increase 216 in separation column bottom temperature is controlled by the reboiler temperature controller 122. This action forces the separation column to work "harder", making for a better product split. If the lean oil is not at its maximum composition, a determination 205 is made whether the separation column bottom product flow is at an acceptable composition. Specifically, it is determined whether a portion of the overhead material is exiting the bottom of the separation column along with the liquid which comprises the separation column bottom product. In the de-ethanizer operation described in FIG. 3, the composition of the separation column overhead fuel gas flow is primarily gaseous $C_2$'s and $C_1$'s, and the composition of the separation column bottom product is primarily liquid $C_3$'s and higher.

If the separation column bottom product flow is at its maximum $C_2$ composition, the separation column bottom temperature is increased 116. If the separation column bottom product flow is not at its maximum $C_2$ composition, then the input of lean oil is increased 207. The input of lean oil 207 cannot exceed a maximum lean oil rate 224. By monitoring for "early" pre-flooding and "early" pre-carryover conditions, this strategy not only allows the process to be optimized so that it can be run at peak capacity while maintaining an increased margin of safety, but affects improved separation even when the operation is run at less than capacity.

If an imminent pre-flooding or an imminent pre-carryover condition is present, a determination 206 is made as to whether or not the separation column is recovering. This is the built-in holding pattern of this preferred embodiment. Having already identified an imminent pre-flood or pre-carryover condition, this block can be tuned to act immediately or hold for a specified period in order to give the separation column the opportunity to recover on its' own. For example, if the separation column bottom temperature derivative falls out of alarm during this holding period, then it is assumed that the separation column is beginning the recovery process on its' own.

If the separation column is not recovering, the reboiler duty controller SP is decreased 208 aggressively, which reduces reboiler temperature. An aggressive decrease in the reboiler duty controller SP of the de-ethanizer operation described in FIG. 3, for example is an immediate decrease of about 20% for about five (5) minutes. Within the period of time during which the reboiler duty controller SP is cut, it is incrementally increased such that the reboiler temperature is at the same level after five (5) minutes as it was just prior to the activation of the alarms. At this time the process is returned to automatic mode which has been previously defined herein as a state in which the reboiler temperature controller 120, possessing a set point (SP), process variable (PV), and an output (OP) will generate a change to the OP if an error (difference) occurs between the PV and the SP.

If it is determined 206 that the separation column is recovering, a determination 210 is made as to whether or not the separation column temperature derivative is returning to normal, i.e. no longer positive. If the separation column temperature derivative is not returning to normal, the reboiler temperature is decreased 208 aggressively as described herein. If it is determined 210 that the separation column bottom temperature derivative is returning to normal, then a determination 212 is made as to whether or not the separation column bottom product flow derivative is returning to normal. If the separation column bottom product flow derivative is not returning to normal, then a determination 213 is made as to whether or not the actual separation column bottom temperature (not the derivative) is returning to normal. If the actual separation column bottom temperature has not returned to normal, then the reboiler duty controller SP is decreased 215 moderately. For the de-ethanizer operation described in FIG. 3, a moderate decrease in reboiler duty controller SP is about a (five) 5 to (fifteen) 15% cut for about two (2) to four (4) minutes. If the actual separation column bottom temperature (not the derivative) has returned to normal, a determination 214 is made as to whether or not the separation column bottom product flow derivative is returning to normal. If the separation column bottom product flow derivative is returning to normal, i.e. it is no longer negative, then the current reboiler duty SP is held 211. If the separation column bottom product flow derivative is not returning to normal, i.e. it is still negative, the reboiler duty SP will be decreased 215 moderately as described herein.

In summary, the flood and carryover predictor of the present invention, preferably with an optimization component, has the advantage of increasing separation column capacity by permitting a separation column to be pushed closer to, or beyond what is now considered normal operating limits, while increasing the margin of safety. The present invention has the further advantage of affecting improved separation even when the operation is running at less than capacity. The flooding and carryover predictor of the present invention has been shown to virtually eliminate flooding events in separation operations such as the de-ethanizer operation described in FIG. 3, and has also been shown to increase capacity by about ten (10)% in such operations. In applications where similar problems have been experienced, the flooding and carryover predictor can be expected to operate similarly.

It is estimated that the increase in feed capacity amounts to about $1 million per year in a $10 million per year operation. Furthermore, the savings in the reduction of products which are off-specification products arising from the elimination of flooding and carryover events is about $300,000 per year in a $10 million per year operation.

Although the invention is described in terms of both a de-ethanizer (with no overhead condenser, a reboiler supplied with steam injection as the heat source, one source of feed which also serves as a source of external reflux, and a second source of external reflux) and a stripping column, the apparatus and method of the present invention has applications in any petroleum separation operation, including rectifying (enriching) columns, operations with conventional reflux conditions including total reflux, limiting reflux and multi-reflux conditions, operations with total and partial condensers, operations in which products are taken from side streams, and so forth.

Specifically, the system of the present invention can be used in any separation process in which some or all of the aforementioned measurable process variables exist. If there is a separation operation wherein the separation column is provided with a heat source, there will be a measurable separation column bottom temperature and a measurable reboiler temperature. Furthermore, if there is a separation column bottom product flow, there will be a measurable flow rate in the line exiting the column and a measurable liquid level of the bottom product in the separation column. If there is a separation column overhead gas fuel flow, there will be a measurable flow rate in the line exiting the top of the separation column. Finally, if there is a separation column differential pressure, there will be a measurable differential pressure within the separation column. If there is a feed source and a reflux source, there will be a measurable flow rate in those lines entering the column Further, the invention has application in separation operations performed in the chemical industry from simple binary system separations to multicomponent separations. This includes both extractive and azeotropic distillation processes, which use additives in order to affect separation.

Although the present invention has been described in considerable detail with reference to certain preferred versions thereof, other versions are possible.

Therefore, the spirit and scope of the appended claims should not be limited to the description of the preferred embodiments contained herein.

What is claimed is:

1. A process for identifying pre-flood conditions in a separation column operation comprising the steps of:
   (a) monitoring at least three measurable process variables selected from the group consisting of a separation column bottom temperature, a reboiler temperature, a separation column bottom flow rate, a liquid level in the bottom of the separation column, and a separation column differential pressure;
   (b) calculating a rate of change for each measurable process variable: and
   (c) identifying a synchronous rate of change which corresponds with a pre-flood condition when the rate of change in the separation column bottom temperature or the reboiler temperature increases, the rate of change of the separation column bottom flow rate or the liquid level in the bottom of the separation column increases, and the rate of change in the separation column differential pressure increases whereby a pre-flood condition is identified.

2. The process for identifying pre-flood conditions in a separation column as recited in claim 1 further including the step of assigning a rate of change alarm to each process variable.

3. The process for identifying pre-flood conditions in a separation column operation as recited in claim 2 further including the step of reducing a reboiler temperature to a reboiler which is connected to the separation column when the rate of change alarms activate simultaneously for at least three of the measurable process variables identified in step (c) of claim 6, whereby a flood condition is avoided.

4. The process for identifying pre-flood conditions in a separation column operation as recited in claim 3 further including the step of incrementally raising the reboiler temperature during a period of time whereby the reboiler temperature returns to the temperature level just prior to the simultaneous activation of the rate of change alarms.

5. The process for identifying pre-flood conditions in a separation column as recited in claim 2 further including the step of reducing a feed rate or cutting at least one reflux rate or raising a separation column pressure when the rate of change alarms activate simultaneously for at least three of the measurable process variables identified in step (c) of claim 6, whereby a flood condition is avoided.

6. The process for identifying pre-flood conditions in a separation column operation as recited in claim 1 further including the steps of:
   (a) distinguishing between early and imminent pre-flood conditions;
   (b) determining if an early or imminent pre-flood condition is present; and
   (c) optimizing the separation column operation when neither an early or imminent pre-flood condition is present by assigning a maximum level to a first process variable and increasing the level of a second process variable when the first process variable is at a maximum level or increasing the level of a third process variable when the first precess variable is not at a maximum level.

7. A process for identifying pre-carryover conditions in a separation column operation comprising the steps of:
   (a) monitoring at least two measurable process variables selected from the group consisting of a separation column bottom temperature, a reboiler temperature a feed rate, and a separation column overhead fuel gas flow rate;
   (b) calculating a rate of change for each measurable process variable; and
   (c) identifying a synchronous rate of change which corresponds to a pre-carryover condition when the rate of change in the separation column bottom temperature or the reboiler temperature increases and the rate of change in the separation column overhead fuel gas flow rate or feed rate increases whereby a pre-carryover condition is identified.

8. The process for identifying pre-carryover conditions in a separation column as recited in claim 7 further including assigning a rate of change alarm to each process variable.

9. The process for identifying pre-carryover condition in a separation column operation as recited in claim 8 further including the step of reducing a reboiler temperature to a reboiler which is connected to the separation column or reducing a feed rate or cutting at least one reflux rate or raising a separation column pressure when the rate of change alarms activate simultaneously for at least two of the measurable process variables identified in step (c) of claim 7, whereby a carryover condition is avoided.

10. The process for identifying pre-carryover conditions in a separation column operation as recited in claim 9 further including the step of incrementally raising the reboiler temperature during a period of time whereby the temperature returns to the level just prior to the simultaneous activation of the rate of change alarms.

11. The process for identifying pre-carryover conditions in a separation column operation as recited in claim 7 further including the steps of:
   (a) distinguishing between early and imminent pre-carryover conditions;
   (b) determining if an early or imminent pre-flood condition is present; and (c) optimizing the separation column operation when neither an early or imminent pre-carryover condition is present by assigning a maximum level to a first process variable and increasing the level of a second process variable when the first process variable is at a maximum level or increasing the level of a third process variable when the first process variable is not at a maximum level.

12. A process for identifying pre-flood and pre-carryover conditions in a separation column operation comprising the steps of:
    (a) placing an electronic sensing device in a location within the separation column operation;
    (b) receiving input from the electronic sensing device in a machine whereby at least two measurable process variables in the separation column operation are monitored, the variables selected from the group consisting of a separation column bottom temperature, a reboiler temperature, a separation column bottom flow rate, a liquid level in the bottom of the separation column, a separation column differential pressure, a feed rate, and a separation column overhead fuel gas flow rate; and
    (c) activating an electronic alarm system coupled to the machine when the rate of change of the measurable process variables identified in step (b) increases; and
    (d) recognizing a pattern in the synchronous rate of change for at least two of the measurable process variables in step (b) which corresponds to a simultaneous activation of the electronic alarm system for the at least two measurable process variables whereby a pre-flood or pre-carryover condition is identified.

13. The process for identifying pre-flood and pre-carryover conditions in a separation column operation as recited in claim 12 further comprising coupling a temperature input controller to the machine for reducing the temperature to a reboiler when the electronic alarm system activates simultaneously for at least two of the measurable process variables whereby the bottom temperature in a separation column is reduced and a flood or carryover condition is avoided.

14. The process for identifying pre-flood and pre-carryover conditions in a separation column operation as recited in claim 13 further including the step of incrementally raising the reboiler temperature during a period of time whereby the reboiler temperature returns to the temperature level just prior to the simultaneous activation of the rate of change alarm.

15. The process for identifying pre-flood and pre-carryover conditions in a separation column operation as recited in claim 8 further including the steps of:
    (a) monitoring at least one measurable process variable;
    (b) assigning a maximum level to the measurable process variable; and
    (c) increasing a separation column bottom temperature when the measurable process variable is at the maximum level whereby the separation column operation is optimized.

16. The process for identifying pre-flood and pre-carryover conditions in a separation column operation as recited in claim 15 wherein the process variable being monitored is a separation column reflux rate.

17. The process for identifying pre-flood and pre-carryover conditions in the separation column operation as recited in claim 15 wherein the process variable being monitored is a separation column bottom product composition.

18. The process for identifying pre-flood and pre-carryover conditions in the separation column operation as recited in claim 17 further wherein the separation column reflux rate is increased when the separation column bottom product composition is not at a maximum level.

19. The process for identifying a pre-flood or pre-carryover condition as recited in claim 12 further comprising coupling a flow input controller to the machine for reducing the feed rate or reducing at least one re flux rate to a separation column or coupling a pressure input controller for increasing the separation column pressure when the electronic alarm system activates simultaneously for the at least two measurable process variables whereby the feed rate or at least one reflux rate is reduced and a flood or carryover condition is avoided.

20. A process for identifying pre-flood and pre-carryover conditions in a separation column operation comprising the steps of:
    (a) placing a sensing device in a location within the separation column operation;
    (b) receiving input from the sensing device whereby at least two measurable process variables in the separation column operation are monitored, the variables selected from the group consisting of a separation column bottom temperature, a reboiler temperature, a separation column bottom flow rate, a liquid level in the bottom of the separation column, a separation column differential pressure, a feed rate, and a separation column overhead fuel gas flow rate;
    (c) activating an alarm system when the rate of change of the measurable process variables identified in step (b) increases; and
    (d) recognizing a pattern in the synchronous rate of change for at least two of the measurable process variables in step (b) which corresponds to a simultaneous activation of the electronic alarm system for the at least two measurable process variables whereby a pre-flood or pre-carryover condition is identified.

21. The process for identifying pre-flood and pre-carryover conditions in a separation column operations as recited in claim 20 further comprising reducing the reboiler temperature in a reboiler connected to the separation column when the alarm system activates simultaneously for at least two of the measurable process variables whereby a flood or carryover condition is avoided.

22. The process for identifying pre-flood and pre-carryover conditions in a separation column operation as recited in claim 22 further including the step of incrementally raising the reboiler temperature during the period of time whereby the reboiler temperature returns to the temperature level just prior to the simultaneous activation of the rate of change alarm.

23. The process for identifying pre-flood or pre-carryover conditions in a separation column operation as recited in claim 20 further including the step of reducing a feed rate or cutting at least one reflux rate or raising a separation column pressure when the rate of change alarms activate simultaneously for the measurable process variables identified in step (b) of claim 11, whereby a carryover or flood condition is avoided.

24. An apparat us for identifying pre-flood and pre-carryover conditions in a separation column operation comprising:
    (a) an electronic sensing device;
    (b) a machine coupled to the electronic sensing device for receiving input from the electronic sensing device whereby at least two measurable process variables in the separation column operation are monitored, the variables selected from the group consisting of a separation column bottom temperature, a reboiler temperature, a separation column bottom flow rate, a liquid level in the bottom of the separation column, a separation column differential pressure, a feed rate, and a separation column overhead fuel gas flow rate;

(c) an electronic alarm system coupled to the machine which activates when the rate of change of the measurable process variables increases; and (d) recognizing a pattern in the synchronous rate of change for at least two of the measurable process variables in step (b) which corresponds to a simultaneous activation of the electronic alarm system for the at least two measurable process variables whereby a pre-flood or pre-carryover condition is identified.

25. The apparatus for identifying pre-flood and pre-carryover conditions in a separation column operation as recited in claim 24 further comprising a temperature input controller coupled to the machine which reduces a reboiler temperature in a reboiler connected to the separation column when the electronic alarm system activates simultaneously for at least two measurable process variables whereby the bottom temperature in a separation column is reduced and a flood or carryover condition is avoided.

26. The apparatus for identifying pre-flood and pre-carryover conditions in a separation column operation as recited in claim 24 further comprising a temperature input controller which incrementally raises the reboiler temperature during a period of time whereby the reboiler temperature returns to the temperature level just prior to the simultaneous activation of the rate of change alarm.

27. The apparatus for identifying pre-carryover or pre-flood conditions in a separation column operation as recited in claim 24 further including a flow controller for reducing a feed rate or at least one reflux rate to a separation column or a pressure controller for increasing a separation column pressure when the electronic alarm system activates for at least two of the measurable process variables identified in step (b) of claim 17 whereby a carryover or flood condition is avoided.

28. An apparatus for identifying pre-flood and pre-carryover conditions in a separation column operation as recited in claim 24 further comprising:

an apparatus for optimizing a separation column operation comprising:

(1) at least one sensing device in at least one location within the separation column operation;

(2) a machine coupled to the at least one sensing device for receiving input from the sensing device; and (3) a temperature input controller coupled to the machine which increases a separation column bottom temperature when a process variable is at a maximum level or a flow controller coupled to the machine which increases a separation column reflux rate when the separation column bottom product composition is not at a maximum level whereby the separation column operation is optimized.

29. A process for identifying pre-flood conditions in a separation column operation comprising the steps of:

(a) monitoring at least three measurable process variables selected from the group consisting of a separation column bottom temperature, a reboiler temperature, a separation column bottom flow rate, a liquid level in the bottom of the separation column, and a separation column differential pressure;

(b) calculating a rate of change for each measurable process variable; and (c) identifying a synchronous rate of change for the at least three measurable process variables in step (a) which corresponds with a pre-flood condition whereby a pre-flood condition is identified.

30. A process for identifying pre-carryover conditions in a separation column operation comprising the steps of:

(a) monitoring at least two measurable process variables selected from the group consisting of a separation column bottom temperature, a reboiler temperature, a separation column bottom flow rate, a liquid level in the bottom of the separation column, and a separation column differential pressure;

(b) calculating a rate of change for each measurable process variable; and (c) identifying a synchronous rate of change for the at least two measurable process variables in step (a) which corresponds with a pre-carryover condition whereby a pre-carryover condition is identified.

* * * * *

UNITED STATES PATENT AND TRADEMARK OFFICE
CERTIFICATE OF CORRECTION

PATENT NO. : 5,784,538

DATED : July 21, 1998

INVENTOR(S) : George E. Dzyacky

Page 1 of 2

Figure 1B:
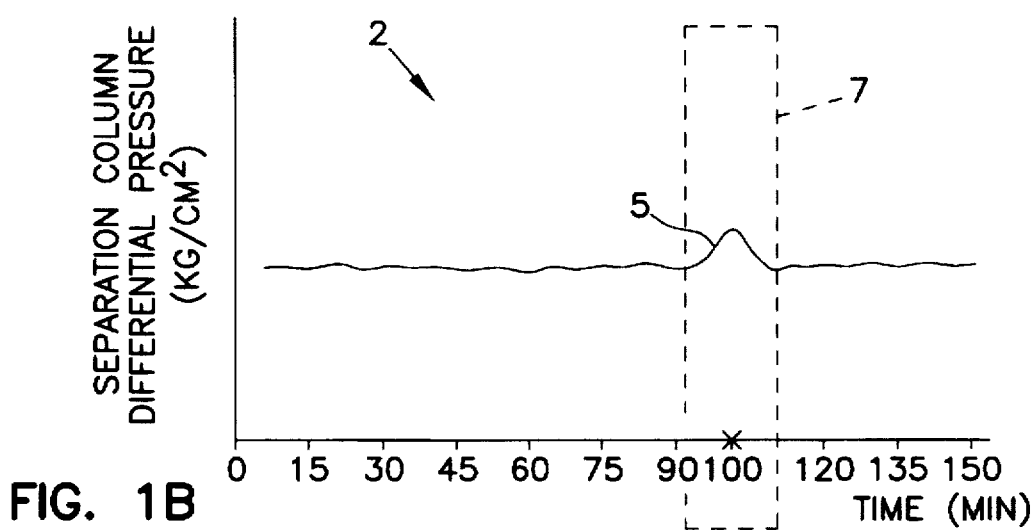
Figure 1C:
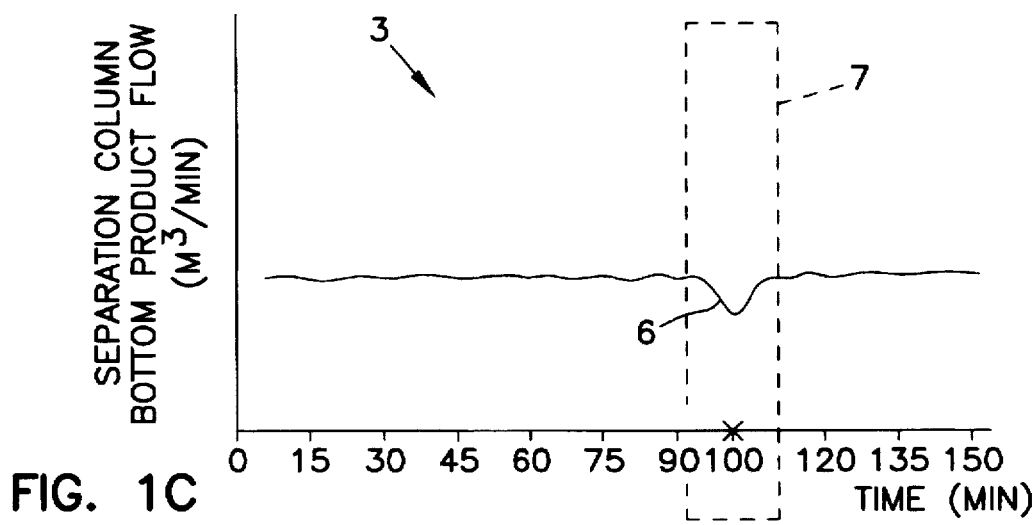

It is certified that error appears in the above-identified patent and that said Letters Patent is hereby corrected as shown below:

At Col. 5, line 35, please delete "Figure 1" and insert --Figure 1A, Figure 1B and Figure 1C--.

At Col. 5, line 35, please delete "is an example" and insert --are examples--.

Figure 2A:
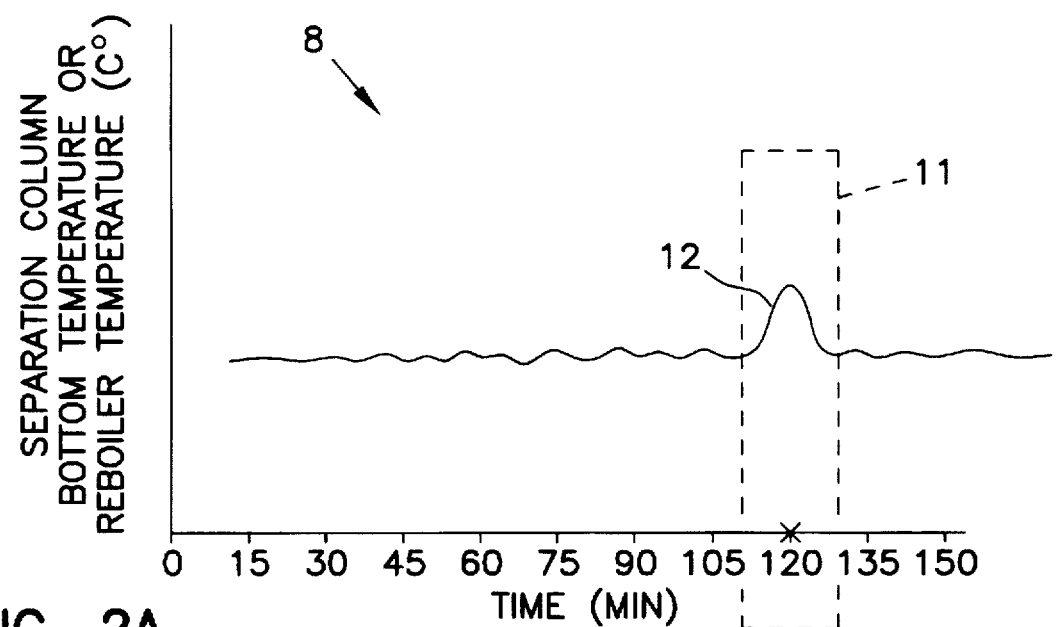
FIG. 2 is an example of a plot of the measurable process variables which change over time during a pre-carryover condition.
Figure 2B:
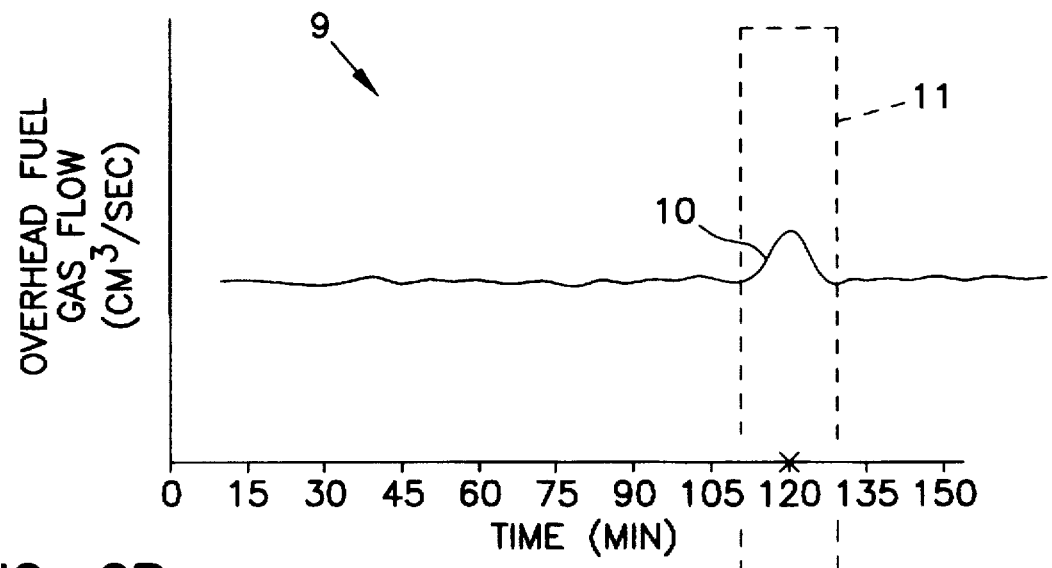

At Col. 5, line 38, please delete "Figure 2" and insert --Figure 2A and Figure 2B--.

At Col. 5, line 38, please delete "is an example" and insert --are examples--.

At Col. 7, line 56, please delete "Figure 1" and insert --Figure 1A, Figure 1B and Figure 1C--.

At Col. 8, line 4, please delete "Figure 2" and insert --Figure 2A and Figure 2B--.

At Col. 12, line 46, please add "." after "flow".

At Col. 17, line 21, please add "." after "column".

At Col. 17, line 44, please delete ":" and insert --;--.

At Col. 17, line 64, please delete "claim 6" and insert --claim 1--.

At Col. 18, line 10, please delete "claim 6" and insert --claim 1--.

At Col. 18, line 31, please delete "reboiler temperature" and insert --reboiler temperature,--.

UNITED STATES PATENT AND TRADEMARK OFFICE
CERTIFICATE OF CORRECTION

PATENT NO. : 5,784,538
DATED : July 21, 1998
INVENTOR(S) : George E. Dzyacky It is certified that error appears in the above-identified patent and that said Letters Patent is hereby corrected as shown below:

At Col. 19, line 51, please delete "claim 8" and insert --claim 12--.

At Col. 20, line 9, please delete "re flux" and insert --reflux--.

At Col. 20, line 41, please delete "operations" and insert --operation--.

At Col. 20, line 49, please delete "claim 22" and insert --claim 21--.

At Col. 20, line 60, please delete "claim 11" and insert --claim 20--.

At Col. 20, line 62, please delete "apparat us" and insert --apparatus--.

At Col. 21, line 24, please delete "two measurable" and insert --two of the measurable--.

At Col. 21, line 41, please delete "claim 17" and insert --claim 24--.

At Abstract, second line from end, please delete "at least than" and insert --at less than--.

Signed and Sealed this

Twentieth Day of July, 1999

*Attest:*

*Attesting Officer*

Q. TODD DICKINSON

*Acting Commissioner of Patents and Trademarks*